United States Patent Office 3,449,192
Patented June 10, 1969

3,449,192
POLYETHYLENE ALUMINUM LAMINATES
George C. Hook, Chicago, Ill., assignor to Continental Can Company, Inc., New York, N.Y., a corporation of New York
No Drawing. Filed Dec. 16, 1966, Ser. No. 602,160
Int. Cl. C23g 1/02; C23f 1/00; C09j 5/02
U.S. Cl. 156—316       10 Claims

ABSTRACT OF THE DISCLOSURE

The adhesion of polyethylene to aluminum substrates is improved by first treating the aluminum surface with hot formic acid followed by treatment with a polynuclear hydrocarbon or a long chain acyl 1,3-diketone chelating agent before application of the polyethylene layer.

BACKGROUND OF INVENTION

Field of invention

This invention relates to the preparation of laminates and more particularly to such laminates wherein a polyethylene layer is adhered to at least one layer of an aluminum substrate.

The prior art

Polymeric coatings in combination with thin layers of aluminum in the form of laminates have found widespread employment in containers such as for packaging food, beverages and the like. In such applications, the coating must possess excellent adhesion characteristics. It must withstand processing of the container contents at elevated temperatures, e.g., 1 to 2 hours at 120° to 125° C. in the presence of water and foodstuff. The coating must remain strongly adherent to the aluminum surface and impermeable during processing operations; otherwise, a satisfactory product cannot be obtained.

It is known that polyethylene is an excellent material for forming coatings for aluminum and other metallic surfaces because of its high resistance to attack by chemicals. Wider application of polyethylene as a protective coating for aluminum surfaces, however, has been inhibited by the fact that good adhesion to the aluminum surfaces is difficult to accomplish because of the inert nature of polyethylene.

SUMMARY OF THE INVENTION

The adhesion of polyethylene to aluminum substrates may be improved by the process of the present invention wherein the aluminum substrate to be coated with polyethylene is subjected to a preparatory treatment comprising first contacting the aluminum substrate with a hot solution of concentrated formic acid and then subsequently contacting the formic acid-treated surface with a chelating agent selected from polynuclear hydrocarbons containing at least two electron donor groups which form chelate rings with aluminum atoms and long chain acyl 1,3-diketones.

On the surface thus prepared, the polyethylene, in the form of film or powder, is applied thereto and then fused to the aluminum substrate by baking at elevated temperatures.

It is a critical and essential step of the present invention that the aluminum substrate be first treated with formic acid prior to contact of the substrate with the chelating agent. While it is not intended to have the process of the present invention limited to any theory regarding the cause or the results obtained by the present process and the improved adhesion properties of the resultant laminated product, it is believed that the criticality of the pretreatment of the aluminum surface with formic acid is due to the fact that the untreated aluminum surface is originally covered with a hydrated aluminum oxide film which interferes with the reaction of the aluminum surface with the chelating agent. Due to the presence of this oxide film, a non-uniform, discontinuous, monomolecular layer of the chelating agent forms when the aluminum substrate is contacted with the chelating agent without pretreatment of the substrate with formic acid. The discontinuous layer of the chelating agent forms a poor bonding surface for the adhesion of the polyethylene. Formic acid, being much more highly reactive than the chelating agent, is believed to completely remove the hydrated aluminum oxide from the aluminum substrate and form an aluminum formate in place thereof, which is readily displaced upon contact of the substrate with the chelating agent. The formic acid pretreatment is, therefore, believed too permit a more complete reaction of the aluminum surface with the chelating agent to form a more uniform, continuous, monomolecular layer of the chelating agent, thereby improving the bonding surface to form stronger bonds with polyethylene.

PREFERRED EMBODIMENTS OF THE INVENTION

Before the aluminum surface is contacted with the formic acid solution, it is desirable that the surface be clean and free from dirt, grease, and other foreign substances. The cleaning and degreasing of the aluminum surface may be accomplished by any suitable means known to the art, such as exposure of the aluminum surface to the hot vapors of a high-boiling organic solvent. After cleaning and degreasing, the aluminum surface is exposed to a solution of formic acid, preferably containing about 77 to about 85 percent by weight formic acid heated to about 150° to about 212° F. Preferably, the formic acid is dissolved in an aqueous solution, although mixtures of water with other suitable solvents such as aliphatic alcohols, such as methanol and propanol, may also be employed.

The required time of exposure of the aluminum surface to the formic acid solution should be sufficient to allow the formic acid to react with and replace the aluminum oxide film on the surface of the aluminum substrate with a continuous film of aluminum formate. Ordinarily, a time of at least 2 seconds will suffice, although longer immersion periods may be employed if so desired.

Following the formic acid treatment, there is then applied to the formic acid-treated aluminum substrate a dilute solution of the chelating agent of the present invention.

Polynuclear hydrocarbon chelating agents useful in the practice of the present invention include those compounds which contain at least two electron donor groups so located with respect to one another that they are capable of forming a ring structure, i.e., a chelate ring with an aluminum atom forming the central metal atom. The principal electron donor groups necessary for ring formation are, in general, those of the strongly non-metallic elements of Groups V–A and VI–A of the Periodic Table, especially those within the atom number range of 7 to 16. The more important donor groups and the chelate-forming structures therefrom contain nitrogen, oxygen, and/or sulfur as donor atoms.

Typical examples of polynuclear hydrocarbon chelating compounds useful in the practice of the present invention include orthodihydroxy aromatic compounds such as 1,2-dihydroxyanthraquinone, 1,2,4-trihydroxyanthraquinone; phenolic compounds such as 8-hydroxyquinoline; aromatic amines such as 1,10-phenanthroline, 5-phenyl-1,10-phenanthroline, 5-chloro-1,10-phenanthroline, 5-methyl-1,10-phenanthroline, 5-nitro-1,10-phenanthroline. Acyl 1,3-diketones useful in the practice of the present invention are acyl 1,3-diketones having 10 to 24 carbon atoms in the acyl group and include capryl acetone, lauryl acetone, myristyl acetone, palmityl, acetone, stearyl acetone, arachidyl acetone, behenyl acetone, and lignoceryl acetone.

The acyl 1,3 diketone may be prepared by reacting the alkyl ester of a saturated fatty acid containing 10 to 24 carbon atoms, acetone, and sodium methoide following the general procedure for preparing acetyl acetone described in Organic Synthesis, vol. 20, pp. 7–10 (1940).

The product obtained in accordance with the process of this invention exhibits a good adhesion over a broad exposure range between the polyethylene coating and the aluminum surface.

Depending upon the thickness of the aluminum material and the applied polyethylene coating, the coated aluminum article may be flexible or rigid.

The term "polyethylene" is intended to include products obtained by polymerizing ethylene alone or in admixture with compounds containing polymer-forming unsaturated groups, such as, for example, vinyl acetate, vinyl chloride, vinyl chloracetate, vinyl esters, ketones, esters, amides, carboxylic acids, esters and anhydrides.

After contacting the aluminum substrate with the chelating agent, the laminating stratum of the polyethylene film is placed over the chelating agent-treated surface. The laminate thus formed is then usually heated at an elevated temperature in a manner well known to those in the art to fuse the polyethylene film to the aluminum substrate. The temperature and time required for the baking will, of course, vary depending upon the polyethylene used. The film thickness of the polyethylene also is a factor effecting the time and temperature required for fusing the polyethylene to the aluminum surface. Films ranging in thickness from 1 to 5 mils or more may be laminated and baked on the aluminum substrates. Thus, the temperature and time required for preparing the polyethylene/aluminum laminate may vary from about 390° to about 450° F. for periods ranging from about 4 to about 6 minutes for polyethylene films ranging in thickness from about 1 to about 5 mils.

The invention will be more clearly understood by referring to the examples which follow. It should be understood that these examples are merely illustrative and should not be considered limitative of the present invention.

EXAMPLE I

An aluminum panel was degreased in the vapor of an aliphatic solvent having a boiling range of 242° to 292° F. The degreased panel was dipped into an aqueous solution of 77 percent formic acid, the solution being maintained at 190° F. The panel was allowed to remain in the formic acid solution for about 2 seconds, after which time the panel was washed in running tap water and air-dried. The dried panel was then dipped into a 1 percent solution of 1,10-phenanthroline in anhydrous ethanol heated to incipient boiling (78° C.).

The phenanthroline-treated panel was then baked in an oven for 2 minutes at 400° F. The cooled, baked panel was then exposed to the hot vapors of an aliphatic hydrocarbon having a boiling range between 242° and 292° F. and then subsequently washed and degreased in a vapor of boiling ethanol to remove the visible excess of phenanthroline on the aluminum surface.

A 3-mil thick polyethylene film was superficially adhere to the phenanthroline-treated surface of the aluminum panel and the assembly was baked in an oven at 415° F. for 6 minutes.

To determine adhesion, the resulting polyethylene/ aluminum laminate was immersed in boiling water for 60 minutes and tested for bond strength. It was found that the bond between the polyethylene and the aluminum substrate was as strong or stronger than the adhered film, so that when it was attempted to peel the polyethylene film from the aluminum surface, the film tore before it could be pulled apart from the aluminum panel.

By way of contrast, when aluminum panels coated with polyethylene in the manner above described, with the exception that the aluminum panels were not treated with formic acid prior to treatment with phenanthroline, were tested for adhesion, the bonds between the polyethylene film and the aluminum panels were found to have very little strength. After the laminate prepared in this contrasting manner was immersed in boiling water for only 5 minutes, the polyethylene film could be stripped away cleanly from the aluminum panel when the laminate was pulled apart.

By way of further contrast, a polyethylene/aluminum laminate was prepared following the procedure of Example I with the exception that the formic acid-treated aluminum panel was dipped into a 1 percent aqueous solution of the sodium salt of ethylenediamine tetraacetic acid. Ethylenediamine tetraacetic acid is a chelating agent known to improve the adhesion of coatings to metallic substrates and such use is disclosed in U.S. Patent No. 2,776,918. The polyethylene/aluminum laminate prepared in this contrasting manner was tested for adhesion by immersing the polyethylene/aluminum laminate in boiling water. After only a few seconds of immersion, the polyethylene film could be easily stripped off the aluminum panel.

EXAMPLE II

An aluminum panel was cleaned by exposing the panel to the vapors of boiling toluene and then dipped into an aqueous solution of 77 percent formic acid, the solution being maintained at 190° F. The aluminum panel was allowed to remain in the formic acid solution for about 2 seconds. The formic acid-treated panel was then washed in running tap water and air-dried. The dried panels were then dipped into a 1 percent ethanol dispersion of 1,2-dihydroxyanthraquinone for 2 seconds, maintained at incipient boiling (78° C.). The so-treated panels were then baked in an oven at 400° F. for 2 minutes.

The visible excess of 1,2-dihydroxyanthraquinone on the aluminum panel surface was removed by the vapor of boiling ethanol until the washings, which were originally pink, were colorless.

A strip of a 3-mil polyethylene film having a density of about 0.95 was superficially adhered to the surface of the dihydroxyanthraquinone and the loosely coated panel was placed in an oven and baked at 420° F. for 6 minutes to provide an adherent coating thereon.

The resulting laminate was tested for adhesion by immersing the laminate in boiling water for 60 minutes. The strength of adherence of the polyethylene film was found to be stronger than the strength of the polyethylene itself, so that when it was attempted to remove the polyethylene film, the film tore before separation from the aluminum surface.

EXAMPLE III

An aluminum panel was cleaned by exposing the panel to the vapor of boiling toluene and then dipped into an aqueous solution of 77 percent formic acid heated to a temperature of 190° F. The aluminum panel was allowed to remain in the formic acid solution for 2 seconds. The formic acid-treated panel was then washed in running tap water and air-dried. The dried panel was dipped into a 1 percent acetone solution of 8-hydroquinoline at 77° F. for about 2 seconds. The 8-hydroquinoline-treated panel was then baked in an oven for 2 minutes at 400° F.

After baking, the excess hydroquinoline present on the aluminum panel was removed by the vapor of an aliphatic solvent having a boiling point between 242° and 292° F. followed by further degreasing in the vapor of boiling ethanol.

A strip of a 3-mil polyethylene film having a density of about 0.95 was superficially adhered to the surface of the hydroxyquinoline-treated aluminum panel and the loosely coated panel was placed in an oven and baked at 415° for 12 minutes to provide an adherent coating thereon.

The resulting laminate was tested for adhesion by immersing the laminate in boiling water for 40 minutes. The strength of adherence of the polyethylene film was found to be stronger than the strength of the polyethylene itself so that when it was attempted to remove the film, the film tore before separation from the aluminum surface.

EXAMPLE IV

An aluminum panel was cleaned by exposing the panel to the vapor of an aliphatic hydrocarbon solvent. The panel was dipped into an aqueous solution of 77 percent formic acid containing 0.01 percent of an ammonium salt of pentadecafluoroctanoic acid wetting agent, the solution being maintained at 190° F. The aluminum panel was allowed to remain in the formic acid solution for about 2 seconds, after which the panel was washed in running tap water and allowed to dry. The dried panel was dipped into a 1 percent acetone solution of stearyl acetone for about 2 seconds at 77° F.

The visible excess of the stearyl acetone on the aluminum panel was removed by the hot vapors of an aliphatic solvent boiling at 242° to 292° F. A drop of water would not spread on the aluminum panel so-treated, indicating that a nonwettable surface had been achieved.

A strip of a 5-mil polyethylene film having a density of about 0.95 was superficially adhered to the stearyl acetone-treated panel and the assembly was placed in an oven and baked at 450° F. for 18 minutes to provide an adherent coating thereon.

By way of contrast, the procedure of Example IV was repeated with the exception that the aluminum panel was not treated with formic acid prior to contacting the aluminum panel with stearyl acetone.

The force required to peel the laminates apart was qualitatively judged by hand tests. It was found that the adhesion was markedly greater in the polyethylene/aluminum laminate that had been treated with formic acid prior to contact with the stearyl acetone after these laminates had been immersed in boiling water for 5 minutes.

What is claimed is:

1. A method of coating aluminum substrates with polyethylene to provide an adherent coating thereon which comprises first contacting the aluminum surface to be coated with a hot solution of concentrated formic acid, contacting the formic acid-treated aluminum surface with a chelating compound selected from the group consisting of polynuclear hydrocarbons containing at least 2 electron donor groups which form chelate rings with aluminum atoms and long chain acyl 1,3-diketones, applying a laminating stratum of polyethylene to the thus-modified surface of the aluminum substrate, and heating the same to produce an adherent coating of polyethylene on the aluminum substrate.

2. The method of claim 1 wherein the polynuclear hydrocarbon chelating agent is an ortho-dihydroxyaromatic compound.

3. The method of claim 1 wherein the polynuclear hydrocarbon chelating agent is 1,2-ortho-dihydroxyanthraquinone.

4. The method of claim 1 wherein the polynuclear hydrocarbon chelating agent is a phenolic compound.

5. The method of claim 1 wherein the polynuclear hydrocarbon chelating agent is 8-hydroxyquinoline.

6. The method of claim 1 wherein the polynuclear hydrocarbon chelating agent is an aromatic amine.

7. The method of claim 1 wherein the polynuclear hydrocarbon chelating agent is 1,10-phenanthroline.

8. The method of claim 1 wherein the acyl 1,3-diketone chelating agent is an acyl diketone having from 10 to 24 carbon atoms in the acyl group.

9. The method of claim 1 wherein the acyl 1,3-diketone chelating agent is stearyl acetone.

10. The method of claim 1 wherein the formic acid solution is heated to a temperature ranging from about 150° to about 212° F.

References Cited

UNITED STATES PATENTS

| 2,776,918 | 1/1957 | Bersworth | 117—75 X |
| 3,115,419 | 12/1963 | Dale | 117—49 |
| 3,186,974 | 6/1965 | Verberg | 117—132 X |
| 3,201,850 | 8/1965 | Kahan | 117—132 X |

ALFRED L. LEAVITT, *Primary Examiner.*

W. E. BALL, *Assistant Examiner.*

U.S. Cl. X.R.

117—75, 132; 148—6.14; 156—3, 22, 316; 161—216